United States Patent [19]
Muldoon

[11] Patent Number: 5,906,174
[45] Date of Patent: *May 25, 1999

[54] ROTATION LIMITER FOR MECHANICAL FLOW ROTARY LIVESTOCK FEEDER

[76] Inventor: Lawrence Muldoon, 9156 Muldoon La., Lancaster, Wis. 53813

[ * ] Notice: This patent issued on a continued prosecution application filed under 37 CFR 1.53(d), and is subject to the twenty year patent term provisions of 35 U.S.C. 154(a)(2).

[21] Appl. No.: 08/582,824

[22] Filed: Jan. 4, 1996

[51] Int. Cl.⁶ .............................. A01K 1/10; A01K 5/00; A01K 39/00
[52] U.S. Cl. ............................. 119/54; 119/57.1; 119/57
[58] Field of Search ................................ 119/52.1, 53.5, 119/54, 55, 57, 57.1

[56] References Cited

U.S. PATENT DOCUMENTS

| | | |
|---|---|---|
| 1,171,742 | 2/1916 | Meyer ........................................ 119/54 |
| 1,212,144 | 1/1917 | Meyer ........................................ 119/54 |
| 1,879,247 | 9/1932 | Holliday .................................... 119/54 |
| 4,353,329 | 10/1982 | Thibault . |
| 4,462,338 | 7/1984 | Thibault . |
| 4,676,197 | 6/1987 | Hoover ...................................... 119/54 |
| 5,311,838 | 5/1994 | Thomas et al. ......................... 119/53.5 |
| 5,351,649 | 10/1994 | Rovira Badia et al. ............... 119/53.5 |

*Primary Examiner*—John G. Weiss
*Assistant Examiner*—Ki Yong O
*Attorney, Agent, or Firm*—Quarles & Brady

[57] ABSTRACT

An apparatus for use with rotating feeder, having an animal activated feedwheel for spreading feed within a trough. A first stopper is connectable to, and extendable from, the feedwheel. The first stopper defines an orbit path when the feedwheel is rotated. A second stopper is connectable to and extendable from a stationary portion of the feeder and into the orbit path. When the first stopper engages the second stopper, the stoppers cooperate to limit rotation of the feedwheel to a single direction about the aperture axis.

17 Claims, 4 Drawing Sheets

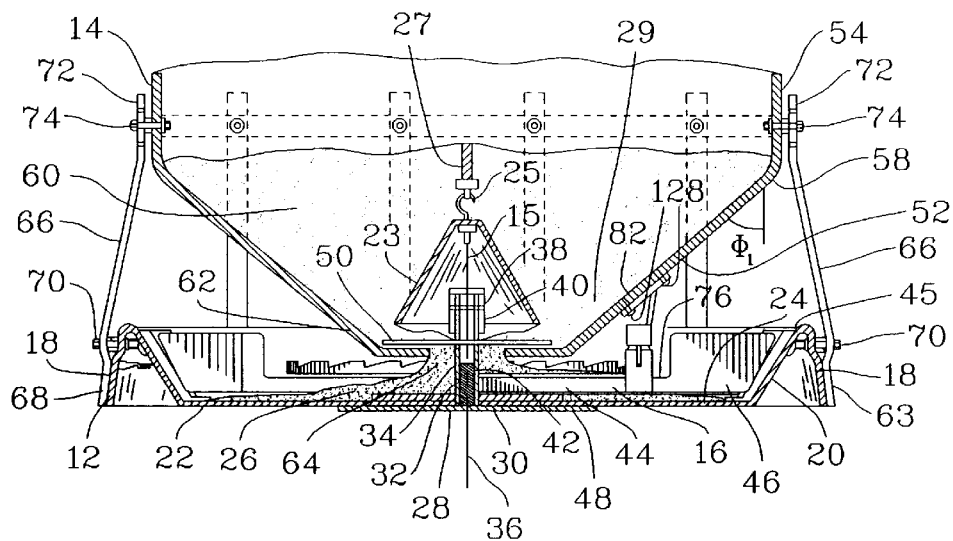
Fig. 2
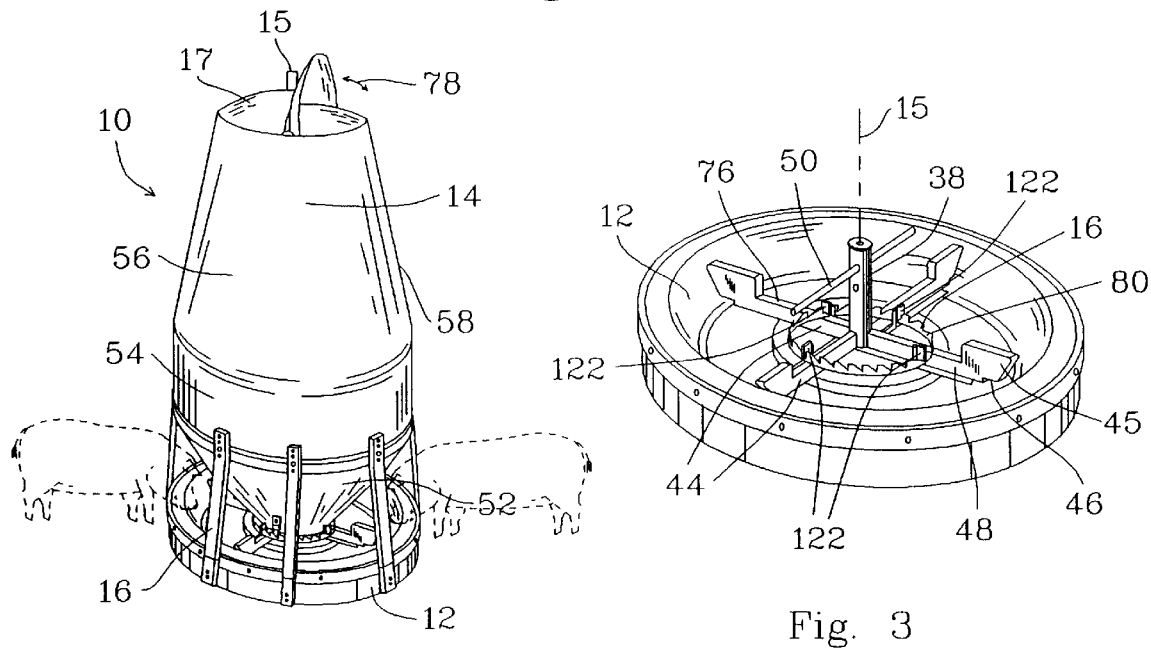
Fig. 1
Fig. 3

ROTATION LIMITER FOR MECHANICAL FLOW ROTARY LIVESTOCK FEEDER

FIELD OF THE INVENTION

This invention relates to livestock feeders, and in particular, to a rotation limiting apparatus for use with a rotary livestock feeder, the feeder being operated by livestock to dispense feed during rotation of a feed wheel.

BACKGROUND OF THE INVENTION

U.S. Pat. No. 4,353,329 and No. 4,462,338 describe self-feeders for livestock having a base receptacle and a hopper positioned above it. The hopper, which contains the feed, has an aperture to allow feed to flow out of it into the base receptacle. A feed wheel mounted below the aperture includes an upper sweep portion extending up into the hopper and a lower portion including radially extending spokes located between the bottom wall of the hopper and the base receptacle. The spokes include upright paddles at their distal ends. In the embodiment shown in U.S. Pat. No. 4,462,338, an inverted moveable cone is provided above the sweep inside the hopper to control the rate of feed flow through the aperture into the base receptacle.

Such self feeders operate when an animal, such as a hog, pushes on one of the paddles to rotate the wheel. The rotating wheel rotates the sweep portion and feed falls from the hopper into the base receptacle, where it can be consumed by the animals. Such feeders are intended to lower feed waste by limiting the amount of feed in the base receptacle at any one time while still allowing the animals to access the feed at will by movement of the feed wheel.

Feeders of this type are used to feed from 25 to 90 pigs, depending on the size of the feeder and the size of the pigs. The animals take turns at the feeder, and it is important that feed always be available.

The animals do not instinctively know how to operate the feeder, so they must learn how to use it. To train pigs to use the feeder, it is customary to manually fill the feed trough (i.e. the base receptacle) and manually keep feed in the trough until the animals learn to associate movement of the feed wheel with the appearance of feed. If the animals fail to learn to operate the feeder, the result is hungry animals who overwhelm the feeder all at once with a behavior of emptying the trough and then simply waiting until feed re-appears through human intervention.

Often it is desirable to place such a feeder in a fence line in between two groups of animals which are kept separately. While such an arrangement can be quite efficient, since one feeder is serving two groups of animals, the feed consumption of the two groups must be relatively equal in both groups or excess feed may accumulate on one side of the feeder. This occurs because pigs tend to learn to move the paddles back and forth through a limited arc, thus failing to rotate feed in the base receptacle around the feeder. At its worse, accumulation of feed on one side of such a fence line feeder can actually jam movement of the feeder. If this occurs, human intervention is required to correct the situation. Manual turning of the feed wheel will sweep the excess feed to the hungrier group of animals in a single rotation.

However, the time spent on training the animals through manual feeding and the management time spent on balancing feed consumption could usefully be spent on other activities if these concerns could be addressed.

SUMMARY OF THE INVENTION

The present invention is an apparatus for use with a rotational feeder, the feeder has a stationary portion including a trough and a hopper, a bottom wall of the hopper forming a feed discharge aperture above the trough and about an aperture axis. The feeder also has a moving portion which includes a feed wheel mounted for rotation between the trough and the hopper about the aperture axis. The feed wheel is adaptable for engagement and movement by an animal. The apparatus comprises a first stopper connectable to and extendable from the feed wheel, the first stopper defining an orbit path around the aperture axis when the feed wheel is rotated about the aperture axis; and a second stopper connectable to and extendable from the stationary portion of the feeder and into the orbit path; whereby, when the first stopper engages the second stopper the stoppers cooperate to approximately limit rotation of the feed wheel to a single rotating direction about the aperture axis.

One object of the present invention is to provide a feeder that the animals will learn to operate more rapidly. With a single direction feeder, feeder operation is more certain. Approximately single direction operation can be provided using any of a number of different dual stopper embodiments.

The first stopper may include a circular ring member having a plurality of teeth that define the orbit path, each tooth separately engaging the second stopper at some point during a rotation of the wheel. In this embodiment, the ring member may extend upwardly from the feed wheel and the second stopper may extend downwardly from the hopper.

Yet another object is to position the first and second stoppers outside the area wherein feed accumulates in the trough. By having the first stopper extend upwardly, the orbit path can be located above the accumulating area. When so positioned, feed cannot obstruct contact between the two stoppers.

Preferably, each tooth includes oppositely facing first and second edges, the first edge arranged to allow rotation only in the single rotating direction and the second edge arranged to inhibit rotation in the direction opposite the single rotating direction.

Another object is to entirely eliminate bi-directional rotation of the feedwheel so that short back and forth feedwheel motions, that tend to compact feed in the lower portion of the hopper, are essentially non-existent. Where each first edge is inclined, a contacting portion of the second stopper will easily move along the edge surface allowing associated rotation. However, where the second edge is perpendicular to the orbit path, movement of a contacting portion along that edge will be restricted and therefore, rotation in the direction associated therewith will be impossible.

To limit bi-directional rotation further, the second stopper may include a contact member, the contact member having first and second contact surfaces the first surface arranged to inhibit rotation in the single rotating direction and the second surface arranged to inhibit rotation in the direction opposite the single rotating direction.

The second stopper includes a connector and a biasing means. The connector connects the second stopper to the stationary portion, the biasing means sandwiched between the connector and the contact member. The biasing means biases the contact portion so that the first and second surfaces are within the orbit path when the contact member is disposed between the second edge of one tooth and a facing first edge of a following and adjacent tooth.

In a preferred embodiment, the feed wheel includes a plurality of spokes extending laterally from the aperture axis, the apparatus further comprising a plurality of couplers, one coupler is connected to and extends upwardly from each spoke, a distal end of each coupler secured to a lower edge of the ring member.

Preferably, the first stopper extends from a radially outlying portion of the feed wheel.

A further object of the invention is to provide a reliable and durable stopping apparatus. By placing the first stopper at an outlying portion of the wheel, animal leverage on the stoppers is limited, thus minimizing wear on both the first and second stoppers.

Yet another object is to provide an apparatus as described above that is relatively inexpensive. By limiting leverage on the stoppers, less substantial stoppers can be employed and still be effective.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a perspective view of a rotary self-feeder embodying the present invention;

FIG. 2 is an enlarged fragmented cross-sectional view of the feeder shown in FIG. 1;

FIG. 3 is an enlarged perspective view of the base member with the feedwheel rotatably mounted therein;

DETAILED DESCRIPTION OF THE PREFERRED EMBODIMENTS

Figure 8:
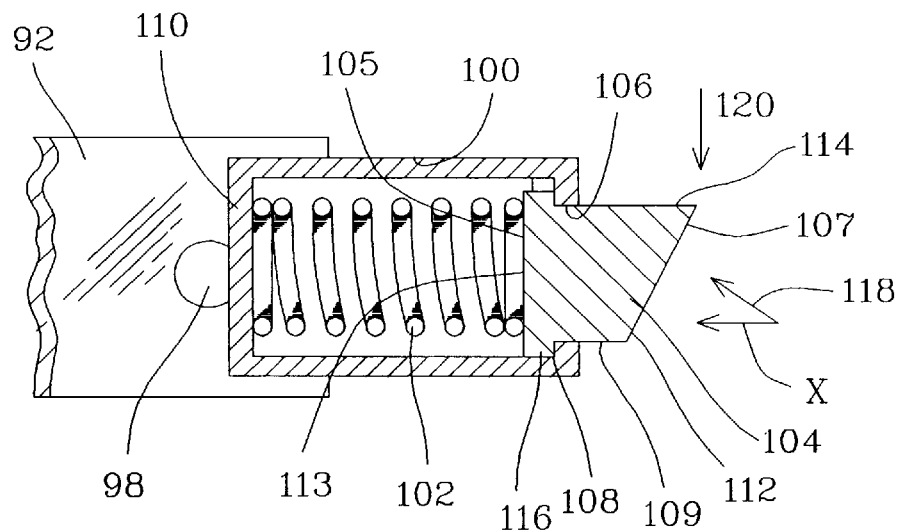
FIG. 8 is a cross-sectional view taken along the 8—8 of FIG. 5.

Referring to FIGS. 1, 2, and 3, the present invention will be described in the context of a rotary hog feeder 10. The feeder 10 includes a circular base member 12, a hopper 14 positioned above the base member 12, and a feed wheel 16 positioned between the hopper 14 and base member 12.

The base member 12 includes an annular external wall 18, an annular internal wall 20 connected to the external wall 18 and concentric therewith, and a circular floor member 22 filling the area defined by the lower edge of the internal wall 20. A generally concave receptacle 24 is defined by the inner surface of the internal wall 20 and the upper surface of the floor member 22. The receptacle 24 is adapted for receiving a quantity of feed material 26 in it.

An axial assembly 28 includes an axial base member 30 and an axial shaft 32 extending upwardly therefrom and terminating at a distal end 34. The base member 30 extends laterally below the floor member 22 to provide support to the axial shaft 32 which extends through a floor aperture 36 centrally located within the receptacle 24. The distal end 34 extends into the receptacle 24.

Referring still to FIG. 2, the feed wheel 16 is mounted on the axial shaft 32 for rotation about a central axis 15 of the shaft 32. The feed wheel 16 includes an upright cylindrical and hollow member 38 which mounts on shaft 32 by sliding vertically downwardly thereover. When the feed wheel 16 is mounted on the shaft 32, it is rotatable therearound. The upright member 38 includes an upper portion 40 positioned within the hopper 14 and a lower portion 42 positioned therebelow.

Referring again to FIG. 3, in the preferred embodiment, the feed wheel 16 includes four spokes 44 extending radially outwardly from, and equi-spaced around, the upright member 38. Each spoke 44 includes a remote portion 46 at a radially distal end and a proximate portion 48 traversing the distance between the upright member 38 and an associated remote portion 46. Each remote portion 46 extends upwardly in the direction parallel to the axial shaft 32 and forms a pushing paddle or plate 45.

Referring also to FIG. 2, two agitator extensions 50 extend radially outwardly from the upper portion 40 of the upright member 38 in opposite directions. The agitator extensions 50 are securely attached to the upright member 38 so that, when the wheel 16 is rotated, the agitator extensions 50 also rotate within the lower portion of the hopper 14.

Referring to FIGS. 1 and 2, the hopper 14 includes a lower inverted frusto-conical portion 52, a central cylindrical portion 54, and an upper upright frusto-conical portion 56, all portions of the hopper being defined by an external wall 58. The wall 58 defines a container area 60 wherein feed material is stored. The wall 58 defining the lower portion 56 makes an angle $\phi_1$ with the vertical. The bottom wall 62 of the hopper, located at the narrow end of the lower portion 52 defines a centrally located hopper aperture 64 through which feed material may exit the container area 60 when the area within the receptacle 24 below the aperture 64 is unobstructed. A filling opening 78 is provided at the top of the hopper 14 to facilitate filling the hopper 14 with feed. A cover 21 can be provided to block the opening 78 when desired. Preferably, the cover 21 includes a stationary portion 17 and a moveable portion 19 which opens to allow access to the interior of the hopper 14 and closes to entirely block the openings 78.

Referring to FIG. 2, preferably, a conical deflector 23 is positioned above the agitator extensions 50 and terminates at a lower edge positioned outwardly of the hopper aperture 64 and inwardly of the lowermost edge of the frusto-conical portion 52. The agitator extensions 50 extend outward just radially beyond the lower edge of the deflector 23. The deflector 23 includes a hook 25 at its narrow uppermost end which facilitates attachment to the lower end of a cable 27 or the like. Referring also to FIG. 1, the cable 27 extends upwardly to the stationary portion 17 of the cover, where the cable 27 is securely bolted at 15 by its upper end. By changing the length of the cable 27, the vertical position of the deflector 23 can easily be altered.

One of the functions of the deflector 23 is to divert the downward flow of feed within the hopper 14 towards the periphery of its bottom and through gap 29 between the deflector lower edge and the bottom wall 62. In addition, the deflector 23 supports most of the weight of the feed above it. Feed is thus prevented from exerting downward force directly against the hopper bottom aperture 64 whereat blockage might otherwise occur.

Figure 4:
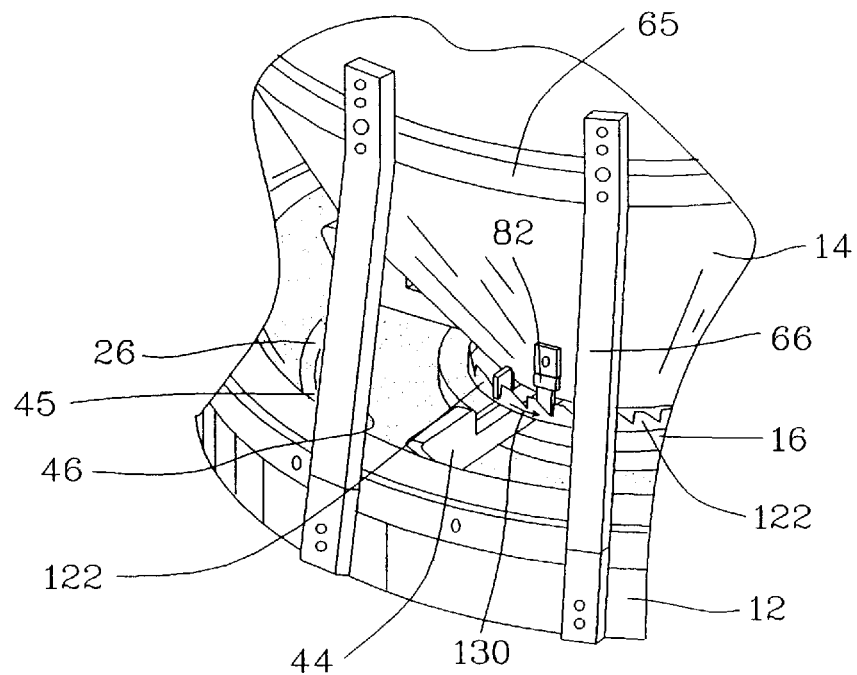
FIG. 4 is an enlarged partial perspective view of the base of the feeder shown in FIG. 1.

Referring to FIGS. 1, 2 and 4, a plurality of support members 66 extend upwardly from the base member 12 to the hopper 14, the support member 66 being equi-spaced around an external surface of the external wall 18 of the base member 12. A support ring 65 is provided near the upper ends of the support members 66, and is securely connected thereto in any of a plurality of ways known in the art.

Preferably, the base member 12 and support members 66 are connected using bolts 70 and the support member 66 and ring 68 are connected using bolts 74. The support ring 65 offers structural integrity to the support members 66, which operate together to secure the hopper 14 above the base member 12. The support ring 65 should be sized so that it tightly fits around some portion of the hopper 14 thus securing and stabilizing the hopper 14 above the base member 12. The support members 66 should be sized so that, when the hopper 14 and base member 12 are secured together, bottom wall 62 of the hopper 14 is spaced above the upper edge 76 of each spoke 44.

Referring still to FIG. 2, when assembled, the upright member 38 should extend upwardly through the aperture 64 and into the frusto-conical lower portion 52 of the hopper 14. Thus, the agitator extension 50 should extend radially outwardly from the upright member 38 within this lower portion 52, near the bottom wall 62. When so positioned, the agitator member 50 agitates feed directly above the aperture 64 during rotation.

In operation, the structure described above allows the feed wheel 16 to be rotate in either a clockwise or counter-clockwise direction. To operate, feed material 26 is deposited within the hopper 14 through the top opening 78 therein. The feed flows through the hopper 14 by gravity, facilitated by the funneling shape of the lower portion 52, around the conical deflector 23, through the aperture 64 in the hopper bottom wall 62, and into the receptacle 24.

The feed material rests in the hopper 14, resting on the lower portion 52 and the conical deflector 23. Some initial small quantity of feed will flow through the aperture 62 into the receptacle 24, but the remaining feed will stay in the hopper 14 until action is taken by an animal or a human.

In general, when feed dispensing is desired, the feed wheel 16 is rotated. The agitator extensions 50 cut into the feed adjacent to the bottom edge of the conical deflector 23, causing the feed to crumble and tend to flow inward. Continued rotation of the feed wheel 16 causes additional feed to be dislodged, pressing previously dislodged feed inward, until feed flows through the aperture 64. Then the rotating action of the spokes 44 tends to force the feed outward in the trough 12 until it is accessible to the animal.

The present invention includes an apparatus that limits rotation of the feedwheel to a single direction (i.e. either clockwise or counter-clockwise). In the figures, the feed-wheel is limited to counter-clockwise rotation. A unidirectional feeder substantially reduces, and in many cases can eliminate, compacted feed at the distal ends of the feed sweep in the hopper, which can hinder proper operation of the feeder.

Figure 5:
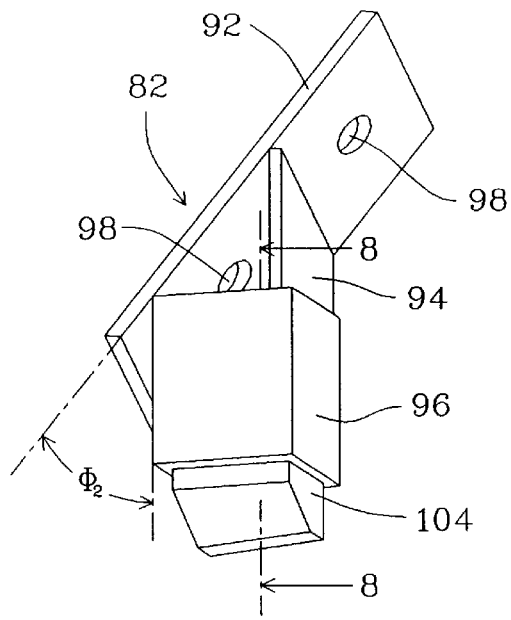
FIG. 5 is a perspective view of one embodiment of a latch.
Figure 6:
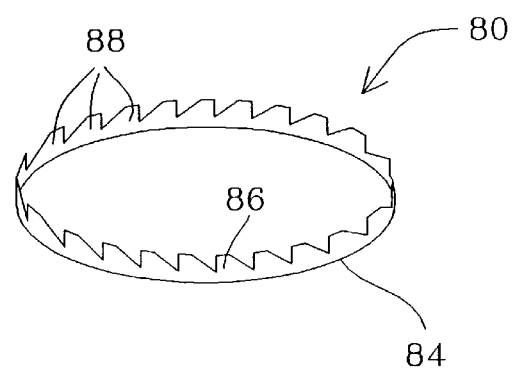
FIG. 6 is a perspective view of the toothed ring shown in FIG. 4.

Referring now to FIGS. 5 and 6, in a preferred embodiment, the present invention includes both a first stopper in the form of a toothed ring 80 and a second stopper in the form of a tumbler type latch 82.

Figure 7:
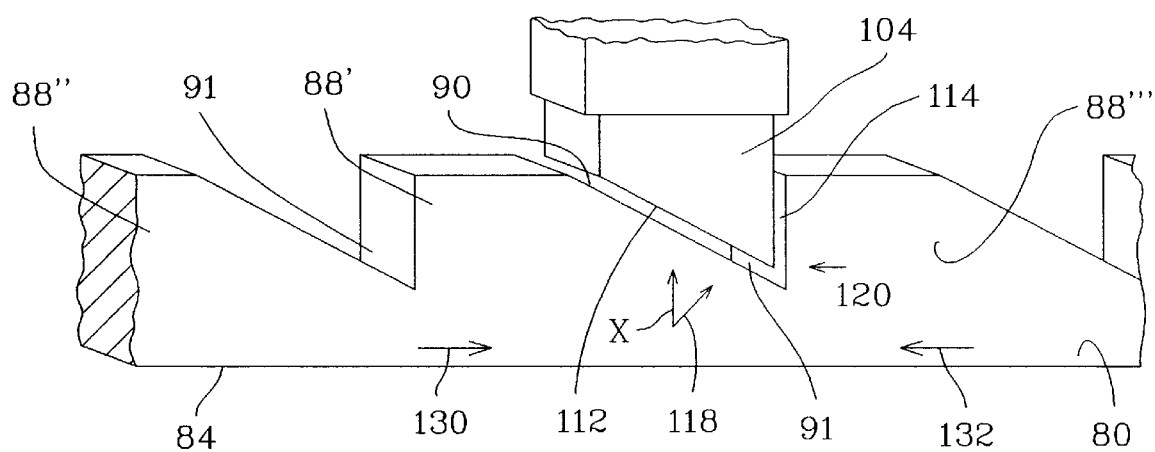
FIG. 7 is an enlarged partial perspective view of the latch and ring shown in FIG. 4.

Referring specifically to FIG. 6, the ring 80 is circular, having a planar lower edge 84 and a jagged upper edge 86. The jagged upper edge 86 defines separate "teeth" 88. Referring also to FIG. 7, each tooth includes a first edge 90, and a second oppositely facing edge 91. As used herein, the term "oppositely facing" means that one of the faces is facially encountered when moving around the ring in one direction, and the other face is facially encountered when moving around the ring in the opposite direction (i.e. oppositely facing does not mean in diametrically opposite directions).

Referring still to FIGS. 6 and 7, while both the first and second edges 90, 91 form non-horizontal surfaces, in the present invention, each first edge 90 defines a surface which is less vertical than the surface defined by each second edge 91. In the most preferred embodiment, each first edge 90 defines a ramped surface making approximately a 30° angle with the planar lower edge 84. Also, in this preferred embodiment, each second edge 91 forms a surface that is vertical (i.e. perpendicular to the lower edge 84). To provide a ring 80 with durable teeth 88, the tip of each tooth is removed, thus leaving a horizontal edge 93 at the distal upper end of each tooth 88.

Referring now to FIG. 5, the tumbler latch 82 includes an anchor member 92, a brace member 94 and a latch portion 96. The anchor member 92 includes two bores 98 that facilitate attachment of the tumbler latch 82 to the lower frusto-conical portion 52 of the hopper 14. The brace member 94 is connected between the anchor member 92 and the latch portion 96, and supports the latch portion 96 on an angle $\phi_2$ relative the anchor member 92, the angle $\phi_2$ preferably being identical to the angle $\phi_1$ between the wall 58 forming the lower portion 52 and the vertical (see FIG. 2). The anchor member 92, brace member 94, and latch portion 96 can be integrally connected in any manner known in the art. Preferably, where these components are constructed of metal, the components are attached using a welding process.

Referring also to FIG. 8, the latch portion 96 includes a housing 100, a helical metallic spring 102, and a lever 104. The housing 100 forms a rectangular box having a single opening 106. The opening 106 is circumscribed by a small inwardly extending lip 108. The housing 100 also includes a base wall 110 opposing the opening 106.

The lever 104 includes an internal end 105 and an external end 107. The external end 107 is defined by an approximately triangularly shaped profile, including a first angled surface 112 and an oppositely facing second surface 114, the first surface 112 making an approximately 30° angle with the second surface 114. The distal portion of the external end 107 forms a flat end 109, substantially parallel to the base wall 100. The internal end 105 is substantially rectangular and includes an internal surface 113 and a flange 116 extending laterally outwardly from the internal end 105.

When assembled, the spring 102 is sandwiched between the base wall 110 and the internal surface 113. The lever 104 is held by the spring 102 in a biased position, the external end 107 being biased in a direction out of the housing 100. The extent to which the lever 104 extends out of the housing 100 is limited by contact between the lip 108 and the flange 116.

Referring to FIGS. 7 and 8, when pressure is applied to the lever 104 in a direction indicated by arrow 118, a component X of the force is directed through the lever 104 and along the axis of the spring 102 which tends to compress the spring 102 between the internal surface 113 and the base wall 110. As the spring 102 compresses under the force, the lever 104 moves into the housing 100.

On the other hand, when pressure is applied to the lever 104 in a direction indicated by arrow 120 there is no component of force in the X direction tending to compress the spring 102 and the lever 104, does not recede back into the housing 100.

Figure 9:
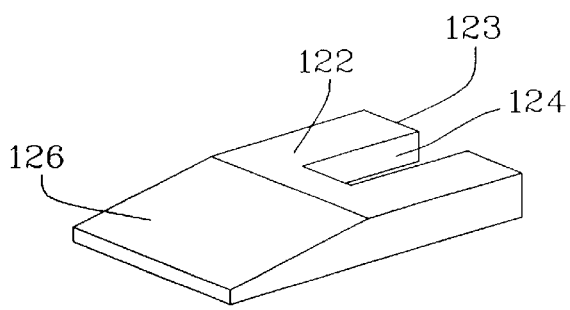
FIG. 9 is a perspective view of one embodiment of a coupler.

Referring now to FIG. 9, in a preferred embodiment, a plurality of couplers 122 are used to secure the ring 80 in an operational position. Each coupler 122 comprises a substantially rectangular and rigid piece of material. Each coupler 122 includes an attachment surface 123 and forms a single slot 124 at one end, the slot being perpendicular to a plane defined by the attachment surface 123. Each coupler may have a tapered surface 126 opposite both the slot 124 and on a surface opposite the attachment surface 123.

While the components which comprise the present invention can be connected to adjacent components in any manner known in the art, where connected components are both formed of a metal or plastic material, it is preferable that the components comprising the present invention be connected by a welding process to ensure integral rigid connections.

Referring again to FIG. 3, when assembled, the toothed ring 80 is positioned above the spokes 44 of the wheel 16, so as to be concentric with a wheel axis 15. To secure the ring in its operational position, four couplers 122 are securely connected to the spokes 44, one coupler per spoke. All of the couplers 122 are positioned an equal distance away from the upright member 38.

During rotation of the feedwheel 16, the teeth 88 define an orbit path (not numbered) having a cross section equal to the area of the second edge 91. The orbit path encircles the upright member 38.

Referring also to FIG. 9, each coupler 122 should be positioned so that its slot 124 will align with the lower edge 84 of the ring 80 when the ring 80 is operationally positioned. With the couplers 122 securely attached, the ring 80 can then be positioned so that its lower edge 84 is received within slots 124. The ring 80 is secured by welding or some other reliable process in this position. Importantly, the slots 124 are relatively shallow so that the couplers 122 do not extend above the lower most portions of the teeth 88. This ensures that the couplers 122 will not interfere with the latch 82 during rotation.

Next, referring to FIGS. 2, 4, and 5, the tumbler latch 82 should be connected to the outer surface of the lower frusto-conical portion 52 of the hopper 14 with the lever 104 extending generally downwardly therefrom. In FIG. 2, the tumbler latch 82 is shown connected to the hopper 14 by two bolts 128, extending through bores 98.

Referring to FIGS. 4 and 7, when the tumbler latch 82 is connected to the hopper 14, and the spring 102 is in its relaxed and relatively uncompressed state, the lever 104 extends down into the orbit path. The tumbler latch 82 is oriented such that the angled first surface 112 faces the angled first edge 90 and the second surface 114 faces the second edge 91.

If desired, a layer of low friction material may be placed on one or both of the angled first edge 90 and angled first surface 112 to facilitate easy movement of the wheel in the direction identified by arrow 130. Similarly, a high friction coating may be applied to the second edge 91 and second surface 114 to completely eliminate sliding movement between those two components.

Referring now to FIGS. 4, 7, and 8, in operation, when an animal pushes on one of the paddles 45 in the counter-clockwise direction as indicated by arrow 130, first edge 90 contacts first surface 112 and provides a force thereagainst in the direction identified by arrow 118. Because there is an X component to the force tending to compress the spring 102, the spring 102 is compressed between the base member 110 and the internal surface 113. This allows the lever 104 to recede back into the housing 100. When this happens the ring 80 rotates in a direction identified by arrow 130.

Once the lever 104 clears tooth 88', the latch 104 is forced out of the housing 100 by the spring 102 and back into an area between teeth 88' and 88". Another push on the paddle 45 in the counter-clockwise direction will rotate the ring 80 again, the lever 104 receding again and then being forced out again into the orbit path between the next two teeth. Because the ring 80 is integrally attached to the feedwheel 16, both the ring 80 and the wheel 16 rotate in the counter-clockwise direction (i.e. in the direction of arrow 130).

However, referring still to FIGS. 4, 7 and 8, where an animal pushes on the paddle in the clockwise direction identified by arrow 132, the ring 80 does not move. This is because the upright second surface 114 contacts the upright second edge 91, resulting in a force in the direction of arrow 120 on the upright surface 114. Because this force has no X directed component directed along a spring axis, the spring 120 does not compress within the housing 100 and the lever 104 can not recede back into the housing 100. Therefore the lever 104 cannot pass over tooth 88'" and rotation in the clockwise direction is not possible.

Referring still to FIG. 7, the first edge 90 and surface 112 angles and sizes and the size of the horizontal edges 93, depend upon use requirements. Similarly, latch 82 dimensions are use dependant.

For example, where easy unidirectional rotation is required, smaller teeth and lesser first edge 90 and surface 112 angles should be employed. Where motion must be severely restricted, the teeth 88 should be small and the angles large so that, a slight push on a paddle 45 forces the lever 104 up and over an adjacent tooth 88. When the wheel is rotated, the lever 104 recedes into the housing 100 after only minimal rotation and quickly enters the area between the next two teeth limiting rotation in the opposite direction.

In the alternative, where the sizes of the first edge 90 and first surface 112 are large, during a partial rotation, the lever 104 may only recede partially into the housing 100, thus allowing a push in the opposite rotational direction to force the wheel 16 back into the original position, the lever 104 pushed outwardly and back between two original teeth. This back and forth rotation although slight, may be unacceptable in certain applications depending upon the type of feed used and the type of animal operating the feeder.

A very simple apparatus has been described that limits movement of the rotating components of a rotational feeder to a single direction. In doing so, this apparatus substantially eliminates compacting of feed within the hopper and the need for human intervention during the initial learning period. In addition, the preferred embodiment has the added benefit of providing additional structural support to the feedwheel spokes 44.

It should be noted that the apparatuses described above are only exemplary and do not limit the scope of the invention, and that various modifications can be made by those skilled in the art that may fall under the scope of the invention. For example, referring to FIG. 3, while the ring 80 is shown positioned above the spokes 44 and extending upwardly, the ring can clearly be located on the spokes 44 extending in any direction (i.e. upwardly, downwardly, radially outwardly). In addition, while the tumbler latch 82 is shown connected to the hopper 14, that latch could be connected to any stationary component of the feeder including the support member 66, or any part of the base member 12, the location being limited by the requirement that the lever 104 extend into the orbit path.

Moreover, while a latched and toothed mechanism has been described for limiting rotation to a single direction, any mechanism that limits movement to one direction could be employed. The angled first edge 90 and surface 112 can be of any degree that will allow sliding and both the edge 90 and surface 112 need not have the same angle for the preferred embodiment described to work.

Furthermore, while the present invention has been described as having a single feedwheel, the invention contemplates feeders having a plurality of feedwheels as known in the art, each wheel being limited to rotation in a single direction. A bi-directional multi-wheel feeder has been described in U.S. Pat. No. 4,353,329.

In order to apprise the public of the various embodiments that may fall within the scope of the invention, the following claims are made:

I claim:

1. In a rotational feeder, the feeder having a stationary portion including a trough and a hopper, a bottom wall of the hopper shaped so that feed in the hopper will flow downward to a feed discharge aperture above the trough and about an aperture axis, the feeder also having a moving portion including a feed wheel mounted for rotation between the trough and the hopper about the aperture axis, the feed wheel including pushing plates rotating in the trough adapted for engagement and movement by an animal and including an agitator extension extending into the hopper which rotates with the feed wheel to assist feed flow from the hopper, the improvement to the apparatus comprising:

a first stopper formed as a circular ring member concentrically aligned with the aperture axis, the ring including a plurality of teeth; and the first stopper engaging with the second stopper to limit rotation of the feed wheel to a single rotating direction about the aperture axis, so that the animals more easily learn to operate the feed wheel and so that compaction of the feed by the pushing plates in the trough does not occur.

2. The apparatus as recited in claim 1 wherein, the ring member extends upwardly from the feed wheel and the second stopper extends downwardly from the hopper.

3. The apparatus as recited in claim 1 wherein, each tooth includes oppositely facing first and second edges, the first edge arranged to inhibit rotation in the single rotating direction and the second edge arranged to inhibit rotation in the direction opposite the single rotating direction.

4. The apparatus as recited in claim 3 wherein, each first edge inhibits rotation less than each second edge.

5. The apparatus as recited in claim 4 wherein, each first edge forms a ramp surface inclined in the direction opposite the single rotating direction and each second edge is approximately perpendicular to the orbit path.

6. The apparatus as recited in claim 1 wherein the second stopper has first and second contact surfaces, the first surface arranged to inhibit rotation in the single rotating direction and the second surface arranged to inhibit rotation in the direction opposite the single rotating direction.

7. The apparatus as recited in claim 6 wherein, the first surface inhibits rotation less than the second surface.

8. The apparatus as recited in claim 7 wherein, the first surface forms a ramp area inclined in the single rotating direction and the second edge is approximately perpendicular to the orbit path.

9. The apparatus as recited in claim 8 wherein, the second stopper also includes a connector and a biasing means, the connector used to connect the second stopper to the stationary portion, the biasing means sandwiched between the connector and the contact member, the biasing means biasing the contact portion toward a position wherein the first and second surfaces are within the orbit path.

10. An apparatus for use with a rotational feeder including a trough and a hopper shaped so that feed will flow in the hopper by gravity downward and to the center thereof, a bottom wall of the hopper forming a feed discharge aperture above the trough and about an aperture axis, the feeder also including a feed wheel mounted for rotation between the trough and the hopper about the aperture axis, the feed wheel including pusher plates rotating in the trough and adapted for engagement and movement by an animal and also including an agitator extension extending into the hopper which rotates with the feed well to assist the feed flow from the hopper, the apparatus comprising:

a first stopper connected to the feed wheel, the first stopper formed as a circular ring located outward from and concentric with the aperture axis and defining an orbit path around the aperture axis when the feed wheel is rotated about the aperture axis, the ring having a plurality of teeth; and a second stopper connected to the hopper and extending into the orbit path, the second stopper including a contact member in releasable engagement with the teeth on the first stopper;

the teeth on the first stopper engaging the contact member of the second stopper to limit rotation of the feed wheel to a single rotating direction about the aperture axis, so that the animals can more easily learn to operate the feed wheel and so that compaction of the feed by the pushing plates in the trough does not occur.

11. The apparatus as recited in claim 10 wherein, each tooth on the ring includes oppositely facing first and second edges, the first edge arranged to inhibit rotation in the single rotating direction and the second edge arranged to inhibit rotation in the direction opposite the single rotating direction.

12. The apparatus as recited in claim 11 wherein, each first edge forms a ramp surface inclined in the direction opposite the single rotating direction and the second edge is approximately perpendicular to the orbit path, opposing the single rotating direction.

13. The apparatus as recited in claim 12 wherein the the contact member has first and second contact surfaces, the first surface arranged to inhibit rotation in the single rotating direction and the second surface arranged to inhibit rotation in the direction opposite the single rotating direction.

14. The apparatus as recited in claim 13 wherein the first surface forms a ramp area inclined in the single rotating direction and the second is approximately perpendicular to the orbit path, opposing the direction opposite the rotating direction.

15. The apparatus as recited in claim 14 wherein the second stopper also includes a connector and a biasing means, the connector used to connect the second stopper to the hopper, the biasing means sandwiched between the connector and the contact member, the biasing means biasing the contact portion toward a position wherein the first and second surfaces are within the orbit path.

16. The apparatus as recited in claim 15 wherein, the feed wheel includes a plurality of spokes extending laterally from the aperture axis, the apparatus further comprising a plurality of couplers, one coupler connected to and extending upwardly from each spoke, a distal end of each coupler secured to a lower edge of the ring member.

17. The apparatus as recited in claim 16 wherein, the couplers extend from a radially outlying portion of the feed wheel.

* * * * *